Patented Nov. 17, 1942

2,301,998

UNITED STATES PATENT OFFICE 2,301,998

GASKET MATERIAL

Wilburn F. Bernstein, Brookfield, and Vincent J. Labrecque, Chicago, Ill., assignors to Victor Manufacturing & Gasket Company, Chicago, Ill., a corporation of Illinois No Drawing. Application August 23, 1939, Serial No. 291,562

1 Claim. (Cl. 288—34)

The present invention relates to a gasket material especially adapted for use in connection with automobiles and other power propelled vehicles, and particularly for use with oil pans, valve covers and other parts or members to be sealed. This gasket material comprises a base of fibrous material such as asbestos bonded by a flexible binder and treated or coated to enhance its gasket properties or characteristics whereby to form an effective seal against the leakage or passage of oil, grease, water and other cooling fluids, general industrial fluids, alcohol, glycerine and other anti-freeze liquids or solutions at elevated temperatures. It further has sufficient inherent elasticity to maintain its resiliency against the compression of the fastening means and to retain its original shape and dimensions against humidity changes as well as expansion and contraction due to temperature changes.

The invention further relates to a novel method of manufacture of the gasket material in sheet form and thereafter blanking from the sheet so formed, gaskets of the desired shape and size. The resultant gaskets are then treated or coated in a manner to enhance or augment their properties and characteristics as sealing members.

By reason of the novel method of manufacture by which the gaskets are blanked from a sheet of asbestos bonded by a novel binder before the sheet has been coated or treated, no scrap or waste results. In the prior methods of manufacture it has been the general practice to make gaskets for the purposes specified from sheets of gasket material previously treated or coated so that after the gaskets have been blanked therefrom, the unused portions were necessarily scrapped. This has resulted in considerable waste in that the unused portions which were scrapped represented approximately 60% to 80% of the total sheet, and formed a major factor in the cost and manufacture of the gaskets so produced.

In the present novel method no waste results in that the scrap or portions remaining after the gaskets have been blanked are again shredded and reused. In carrying out the present novel method, virgin asbestos fiber is edge-run, i. e., subjected to a rolling, sliding action of a heavy weight for the purpose of opening up the agglomerates as the asbestos is received from the mine. The resultant fiber is placed in the beater of the conventional paper-making type and therein mixed with water until it has a concentration of approximately 2% to 6% solids. To this mix in the beater is then added a binder comprising a mixture of polymerized chloroprene latex and rubber latex, to which has been added a suitable anti-oxidant, accelerator, supporting colloid and dispersing agent. There may also be added a suitable dye for giving the product the desired color. The binder mix is added very slowly to the beater and the resultant mix or aggregate is then beaten for approximately twenty to thirty minutes. It is then dropped into a paper making machine where it is sheeted in the regular paper or board making procedure, after which it is ready to be blanked into gaskets of the desired shape and size.

In the preparation of this gasket material, excellent results have been secured by mixing the following ingredients and in approximately the given proportions:

| | Pounds |
|---|---|
| Edge run virgin fiber | 300 |
| Polymerized chloroprene latex (50% solids) | 75 |
| Rubber—natural latex (60% solids) | 62.5 |
| Phenyl-beta-naphthylamine | 1.5 |
| Zinc oxide | 3.75 |
| Casein | 0.16 |
| Sodium salt of polymerized poly-aryl sulphonic acids | 0.05 |
| Black dye | 1.4 |

The above quantities of polymerized chloroprene latex as solids in approximately a 50% emulsion and the rubber in natural latex form as solids in approximately a 60% emulsion, is mixed with the dispersion comprising an anti-oxidant such as the phenyl-beta-naphthylamine, an accelerator such as zinc oxide, a supporting colloid such as casein and a dispersing agent such as sodium salt of polymerized poly-aryl sulphonic acids. To this may be added a desirable dye. The ingredients comprising the emulsion and dispersion phases are thoroughly mixed together with a steady slow agitation and then slowly added to the beater. The resultant mix comprising the fiber, emulsion and dispersion after being thoroughly mixed together, is then formed into a sheet on the conventional paper making machine which is preferably, although not necessarily, of the wet machine type. The sheet so formed is then dried and the binder cured after which gaskets are blanked therefrom.

Due to the fact that in the production of gaskets there is approximately 60% to 80% waste, the novel invention comprehends re-using the scrap formed in the blanking operation and this is accomplished by refiberizing the scrap in a swing hammer fiberizing mill having screen plates containing openings of approximately ⅛ to ¼ inch in size so as to segregate any lumps. The refiberized scrap is then added to the beater with a suitable quantity of virgin fiber which has been edge-run and the blend of binder is then added slowly to the beater for binding the virgin fiber and scrap into one uniform sheet. After the batch has been thoroughly mixed as explained above, it is dropped into the conventional paper making machinery and made into a sheet or board. The following formula gives the approximate composition of the sheet or board in which has been incorporated the scrap:

| | Pounds |
|---|---|
| Scrap of above master batch | 260 |
| Virgin fiber | 140 |
| Polymerized chloroprene latex (50% solids) | 37.5 |
| Rubber—natural latex (60% solids) | 31.25 |
| Phenyl-beta-naphthylamine | 0.75 |
| Zinc oxide | 1.875 |
| Casein | 0.08 |
| Sodium salt of polymerized poly-aryl sulphonic acids | 0.025 |
| Black dye | 0.7 |

The percentage of scrap may be varied through a wide range and good results have been secured by using as much as 80% scrap. In the initial formula in which virgin fiber alone is used, best results have been secured by using approximately 80% fiber to 20% binder, although the proportions of binder to the virgin fiber may vary from 10% to 35%, depending upon the properties desired in the finished product and the uses to which it is to be placed. If 10% binder is used, the sheet or board is more porous in structure and its flexibility is somewhat lower than that where 20% to 35% of the binder is employed. Likewise, the resistance to high temperature oils is somewhat decreased where a percentage of binder greater than 20% is employed.

As scrap is always present in the manufacture of gaskets from sheet material, it will be evident that the production runs subsequent to the initial batch, will normally include scrap. However, the finished product will contain approximately the same percentages of fiber to binder as outlined above.

The novel invention further comprehends a base board or sheet having all of the inherent advantages of the above mentioned sheet or board, but in addition, may be compressed to a greater degree. It has widespread application where the flanges on one or both sides of the member to be sealed are of light weight stampings inadequately bolted down, such as are commonly found in automobile valve covers and oil pans. At the present time, cork is used to a considerable extent due to its high compressibility. However, cork gaskets have a relatively low resistance to oil, heat, aging, water, anti-freezes, etc., deteriorate in stock, lack strength, are relatively expensive and change in dimensions due to humidity and temperature differences. All of these commonly known disadvantages are entirely lacking in our novel product.

As an example of a product having a relatively high compressibility, we have secured exceptional results with the following formula and in approximately the following proportions:

| | Pounds |
|---|---|
| Asbestos fiber | 200 |
| Felt fiber | 100 |
| Polymerized chloroprene latex (50% solids) | 75 |
| Rubber—natural latex (60% solids) | 62.5 |
| Phenyl-beta-naphthylamine | 1.5 |
| Zinc oxide | 3.75 |
| Casein | 0.16 |
| Sodium salt of polymerized poly-aryl sulphonic acids | 0.05 |
| Black dye | 1.4 |

It will be appreciated that this formula is similar to that first mentioned, except that 100 lbs. of wool felt fiber which is preferably non-permeable and non-absorbent, is substituted for 100 lbs. of the virgin fiber. In this example, the felt fiber is added to the beater and beaten with the beater blades against the bed plate until the felt fibers are broken up into shorter lengths. To this is then added the requisite amount of asbestos fiber which has been edge-run prior to use, and the aggregate is thoroughly mixed. After this has been accomplished, the binder is added slowly and the whole mix is beaten for approximately twenty to thirty minutes. The batch is then dropped out of the beater into a conventional paper making machine and sheeted. After drying, gaskets may be blanked therefrom in the manner previously described.

It will be apparent that scrap results from the blanking operation and this scrap is re-used in the manner previously described and in the proportions disclosed for incorporating the scrap in the sheet, the only variation being that in place of 140 lbs. of virgin fiber, this 140 lbs. is divided into approximately 90 to 100 lbs. of virgin asbestos fiber and 50 to 40 lbs. of felt fiber.

The gaskets so produced, due to the incorporation of felt fiber, have a high compressibility and an extremely low coefficient of expansion and contraction due to temperature and humidity conditions. Although the amount of felt incorporated is given as one-third of the base fibers, this amount may be varied through an appreciable extent. For example, if less compression or resiliency is desired, the amount of felt fiber may be dropped to approximately 10% of the approximately 300 lbs. of fiber used. For every 15% step-up in felt fiber, an approximately 5% increase in binder is contemplated, and similarly, for every 15% decrease in felt fiber from the original 33⅓% the binder should preferably be decreased by 5%.

The preformed gasket as blanked from either sheet or base board is then coated as by dipping in a solution of an oil resistant elastic composition. This coating provides a covering or envelope completely surrounding the gasket and sealing the edges and all vulnerable portions against leakage. Excellent results have been secured by using one of the synthetic rubbers as a base, each suitably compounded and dissolved in a suitable solvent to produce a solution of dipping consistency. Such a coating augments the plasticity and elasticity of the gasket, as well as its resistance to attack by oils, water, general industrial fluids, and anti-freeze solutions, including alcohol, glycerine, etc.

The following formulae relate to coatings of the type with which we have secured excellent results:

A

| | Gallons |
|---|---|
| Reaction product of sodium polysulphide and dichloroethane or dichloro ethyl ether | 2 |
| Ethylene dichloride | 4 |
| Toluol | 4 |

B

| | Parts |
|---|---|
| Polymerized chloroprene | 100 |
| Dibutyl phthalate | 10 |
| Coal tar | 5 |
| Wood rosin | 3 |
| Zinc oxide | 5 |
| Channel black—carbon black | 10 |
| Thermatomic or re-enforcing soft carbon black | 30 |
| Stearic acid | 1.5 |
| Benzothiazyl disulfide | 1 |
| Dibutyl amine | 0.2 |
| Sulfur | 1.3 |
| Phenyl-beta-naphthylamine | 2 |
| Toluol | 887.25 |

C

| | Pounds |
|---|---|
| Polyvinyl chloride | 14 |
| Toluol | 86 |

D

| | Parts |
|---|---|
| Polymerized butadiene and resin | 100 |
| Dibutyl phthalate | 10 |
| Coal tar | 5 |
| Wood rosin | 3 |
| Zinc oxide | 5 |
| Channel black—carbon black | 10 |
| Thermatomic or re-enforcing soft carbon black | 30 |
| Stearic acid | 1.5 |
| Benzothiazyl disulfide | 1 |
| Dibutyl amine | 0.2 |
| Sulfur | 1.3 |
| Toluol | 1226 |

E

| | Pounds |
|---|---|
| Rubber hydrochloride | 6 |
| Toluol | 35.6 |
| Dibutyl phthalate | .6 |

F

| | Parts |
|---|---|
| Mixed polymer of (1) polymerized butadiene and acrylic nitrile, or (2) polymerized butadiene and styrene | 100 |
| Zinc oxide | 5 |
| Sulfur | 3 |
| Thermotomic carbon black | 10 |
| Zinc dibutyl dithio-carbamate | 1.5 |

The coating solution is prepared in two parts. The compounded material lacking the accelerator is dissolved in an organic solvent as benzol, toluol, ethylene dichloride, carbon tetrachloride, etc. The accelerator, zinc dibutyl dithio carbamate is dissolved in a separate portion of the same solvent. At the time the coating solution is to be used the two parts are thoroughly mixed, but are kept separate until this time to prevent any possible preliminary set-up or gelling of the material.

This latter synthetic coating requires but an air dry and is self-curing. Although best results have been secured with an 8% to 10% solution, satisfactory results have been obtained within a range of 5% to 15% solids.

Each of these coatings may be applied in any desirable manner such as dipping, roll-coating or spraying, and is subsequently dried and/or cured to improve its oil resistance characteristics.

Although excellent results have been secured when employing a binder of polymerized chloroprene latex and natural rubber latex, good results may be had by substituting for the chloroprene latex, an emulsion or dispersion of any one of the synthetic rubbers or plastic bases listed under the items A, B, C, D, E and F in connection with the coating to be applied to the blanked gaskets. The proportions of the substituted emulsion or dispersion and of the rubber latex would be in approximately the same percentage as outlined above.

After the gasket is coated with one of the above synthetic rubber coatings, it is preferably treated to prevent it from sticking to the flanges or complementary surfaces of the joint between which it is mounted. This may be accomplished by coating the gasket with a composition of the following ingredients and in approximately the given proportions:

| | Pounds |
|---|---|
| Cellulose acetate | 4 |
| Acetone | 45 |
| Cellosolve acetate | 25 |
| Toluol | 18 |
| Methyl phthalyl ethyl glycolate—plasticizer | 0.5 |

Although excellent results have been obtained with this coating formula, good results may be had by dusting or coating the finished gasket with graphite, mica or other suitable antisticking substances.

The finished product is highly resistant to oils, both of the lubricating and corrosive types. It will effectively withstand alcohol, glycerine and other anti-freeze solutions, general industrial fluids, and water at elevated temperatures. As to its heat resistance and aging properties, the present product will effectively withstand temperatures of 250 to 325° F. over long periods of time.

The present invention is particularly adapted to replace all highly compressible packings including cork and cork fiber, plasticized protein saturated papers, compressed asbestos sheet packings and the like. It has a very much higher heat resistance and will resist temperatures up to 325° F. over considerable periods of time, whereas the other products are limited to approximately 225° F. It has greatly improved resistance to oils of all types, industrial fluids, anti-freeze and other fluids. It is highly compressible and flexible, and maintains its life and resiliency for periods of considerably greater length than any of the above types of packings or gasket materials. It has great stability, in that it is unaffected by humidity conditions and by expansion and contraction due to temperature changes.

Although we have set forth above certain formulae and proportions of the ingredients, it is to be understood that various modifications and variations therefrom are comprehended in the present invention.

Having thus disclosed the invention, we claim:

A soft packing gasket for light weight stampings and having a high degree of compressibility composed of a base of asbestos and wool felt fibers and a binder of polymerized chloroprene latex and natural rubber latex, the binder comprising 10% to 35% of the resultant sheet.

WILBURN F. BERNSTEIN.
VINCENT J. LABRECQUE.